Dec. 6, 1966     C. G. SIMONS     3,289,634
PREDETERMINED COLLAPSE TYPE MILKING MACHINE INFLATION
Filed June 25, 1965
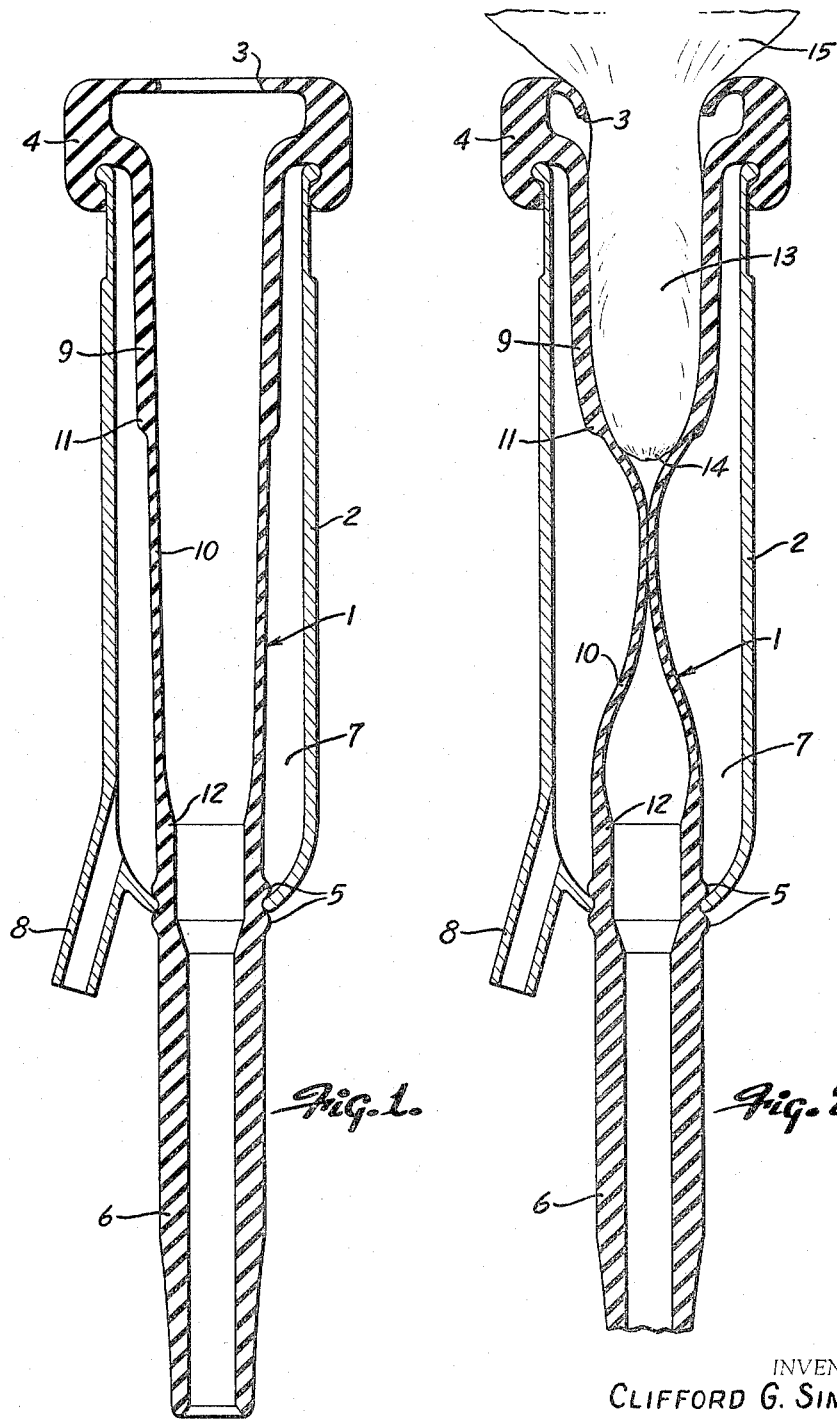
INVENTOR.
CLIFFORD G. SIMONS
BY Andrus & Starke
ATTORNEYS

3,289,634
PREDETERMINED COLLAPSE TYPE MILKING MACHINE INFLATION
Clifford G. Simons, Delavan, Wis., assignor to Sta-Rite Products, Inc., Delavan, Wis., a corporation of Wisconsin
Filed June 25, 1965, Ser. No. 467,037
3 Claims. (Cl. 119—14.52)

This invention relates to a teat cup inflation for a milking machine and more particularly to an improved inflation design adapted to provide proper massage and reduce hemorrhaging and hardening of the cow's teat.

In the conventional milking machine, the teat cup includes an inner, flexible rubber inflation which is applied to the cow's teat and an outer rigid metal shell which is spaced from the inflation to provide a clearance or space therebetween. The lower end of each inflation is connected to a claw or bucket which in turn is connected to a vacuum line so that a continuous vacuum is applied through the hose to the interior of the inflation. By applying the vacuum to the teat end, milk is drawn if the upper teat cistern is open and milk is present.

Under present milking theory, the milk is drawn only by the vacuum applied to the teat end. However, continuous exposure to the vacuum will cause congention of blood or hemorrhaging of the teat end. Congestion caused by unrelieved vacuum reduces the flexibility of the teat sphincter muscle and consequently the natural protection against invasion by microorganisms. The more apparent damage done by unrelieved vacuum and improper massage is eroded teat ends, hemorrhaging and damaged teat ends.

To prevent the continuous or unrelieved application of vacuum and provide the necessary massage for the teat, atmospheric pressure and vacuum are alternately applied within the space between the inflation and the outer shell by a pulsator.

When atmospheric pressure is applied to the space between the shell and the inflation, the pressure differential between the interior and exterior of the inflation causes the inflation to be drawn inwardly or collapsed. The greatest pressure is normally exerted just below the teat end and with proper inflation design, the pressure will vacuum on the teat end.

In the past, the pressure was applied equally along the length of the inflation to squeeze the teat and thereby close off the teat body either at the upper end where the teat enters the inflation or at some point between the upper end and the lower teat end. However, under more modern theory, the greatest pressure is exerted just below the teat end and with proper inflation design, the pressure will collapse and close off the inflation to thereby relieve the vacuum on the teat. The upper portion of the inflation hugs the teat due to the natural tension of the rubber pulling inwardly, and the upper portion of the inflation is not drawn in by the vacuum since this portion of the inflation is occupied by the teat tissue.

The present invention is directed to an improved inflation designed to effectively collapse and close off the inflation at the teat end to thereby provide proper massage for the teat and prevent hemorrhaging and hardening of the teat. According to the invention, the inflation includes an upper body section and a lower body section. The upper body section has a substantially greater wall thickness than the lower body section and terminates at its lower end in an abrupt step or shoulder. The step is located approximately at the teat end when the inflation is applied to the cow's teat. When atmospheric pressure is applied within the space between the shell and the inflation, the upper portion of the lower body section, having a thin wall section, will initially collapse on the end of the cow's teat, thus shutting off the vacuum which has been applied to the sphincter muscle which regulates the flow of milk from the milk cistern within the udder. Subsequently, the remaining portion of the lower body section will progressively collapse to close off the inflation. This design, utilizing the thicker upper body section, provides an uneven collapse of the inflation on the cow's teat. As the teat is contained within the thicker wall portion of the inflation which does not collapse to any great extent, the teat itself will not be closed off, but instead, the thinner lower body section will collapse on the teat end to relieve the vacuum. This design provides proper massaging of the teat as well as preventing hemorrhaging and hardening of the teat.

The inflation construction of the invention is an integral one-piece inflation having a thicker upper body section and a thin wall lower body section. No auxiliary bands or sleeves are required and this substantially reduces the initial molding cost as well as enabling the inflation to be more readily cleaned after the milking operation.

Other objects and advantages will appear in the course of the following description.

The drawings illustrate the best mode presently contemplated of carrying out the invention.

In the drawings:

FIG. 1 is a vertical section of a teat cup incorporating the inflation of the invention;

FIG. 2 is another vertical section showing the teat cup applied to a cow's teat, with the inflation being in the collapsed position.

The drawings illustrate a teat cup for a milking machine which includes an inner, flexible, rubber inflation 1 which is mounted within an outer metal shell 2. The upper end of inflation is provided with a mouth 3 which receives the cow's teat and the mouth is provided with a downwardly extending flange 4 which is sealed against the upper end of the shell 2.

The lower portion of the body of the inflation is provided with a pair of circumferential ribs 5 and the inflation 1 extends through an opening in the shell 2 and the portion of the shell bordering the opening is engaged between the ribs 5.

The lower end of the inflation defines a nipple 6 which is adapted to be attached to a nipple connected to a claw or milk bucket.

In order to alternately apply vacuum and atmospheric pressure to the space 7 between the outer shell 2 and inflation 1, a nipple 8 is connected to the shell and communicates with the space 7. A tube or hose, not shown, is connected between the nipple 8 and a standard pulsator.

According to the invention, the inflation 1 includes an upper body section 9 and a lower body section 10. The upper body section has a substantially greater wall thickness than the lower body section and the upper body section terminates in an abrupt step or shoulder 11. The upper body section 9 has a substantially uniform wall thickness throughout its length and similarly, the wall thickness of the lower body section, while less than the wall thickness of the upper body section, is substantially uniform throughout its length.

The lower end of the lower body section flares inwardly, as indicated at 12, to provide an increased thickness for the attachment of the lower end of the shell, as previously described.

In use, the cow's teat 13 is received within the inflation and the teat end 14 terminates approximately at the step 11. The upper end, or mouth 3, of the inflation is located immediately beneath the udder 15.

The nipple 6 is connected to a continuous source of vacuum so that the interior of the inflation 1 will be subjected to continuous vacuum to draw milk from the teat.

To prevent the continuous application of vacuum and provide the proper message for the teat, atmospheric pressure and vacuum are alternately applied within the space 7 by the pulsator, not shown. When atmospheric pressure is applied within the space 7, the pressure differential between the outer surface and the inner surface of the inflation will tend to draw the inflation inwardly or collapse the inflation, as shown in FIG. 2. As the lower body section 10 has a substantially thinner wall thickness than the upper body section 9, the point of first collapse will be immediately beneath the step 11 at a location where the inflation will collapse on the end 14 of the cow's teat, thereby shutting off the vacuum which has been applied to the sphincter muscle which regulates the flow of milk from the milk cistern within the udder. As the upper body section 9 has a substantially greater wall thickness than the lower body section 10, the upper body section will not collapse to any great extent, with the result that the teat itself will not collapse or be shut off.

When the atmospheric pressure within the space 7 is relieved and vacuum is applied, the pressure on both sides of the inflation will be approximately the same and the inflation will expand, by virtue of its natural resiliency, to its original condition, as shown in FIG. 1.

The inflation design of the invention provides an inflation which will initially collapse at a location in alignment with the teat end to thereby shut off the vacuum to the teat without actually collapsing the teat itself. This type of action is provided by a one-piece molded inflation having portions of different wall thickness. The inflation does not utilize additional sleeve or gaskets and thereby eliminates the possibility of auxiliary sleeves or gaskets shifting or moving on the inflation during use. The integral one-piece inflation of the invention also simplifies the cleaning procedure which is required after each milking operation.

Various modes of carrying out the invention are contemplated as being within the scope of the following claims particularly pointing out and distinctly claiming the subject matter which is regarded as the invention.

I claim:

1. An inflation for a milking machine, comprising a one-piece body portion, a mouth portion located at one end of the body portion and adapted to receive a cow's teat, and a nipple section located at the opposite end of the body portion and adapted to be connected to a source of vacuum, said body portion including a first body section and a second body section, said first body section being located adjacent the mouth and having a substantially greater wall thickness than the second body section, the end of the first body section joining the second body section defining a generally abrupt step, said step being adapted to be located approximately at the termination of the teat end when the inflation is applied to the cow's teat, and said second section initially collapsing when atmospheric pressure is applied to the outer surface of said inflation to thereby shut off the vacuum to the sphincter muscle of the teat.

2. An inflation for a milking machine, comprising a one-piece body portion, a mouth portion located at one end of the body portion and adapted to receive a cow's teat, and a nipple section located at the opposite end of the body portion and adapted to be connected to a vacuum line, said body portion including an upper body section and a lower body section, said upper body section having a substantially uniform wall thickness throughout its length and having a substantially greater wall thickness than the wall thickness of said lower body section, said lower body section having a substantially uniform wall thickness throughout its length, and an abutment formed on the outer surface of the inflation at the junction between the upper body section and the lower body section, said abutment being adapted to be located approximately at the termination of the teat end when the inflation is applied to the cow's teat, and said lower section initially collapsing when atmospheric pressure is applied to the outer surface of said inflation to thereby shut off the vacuum to the sphincter muscle of the teat.

3. A teat cup assembly for a milking machine, comprising a rigid outer shell, a resilient one-piece inflation spaced within the shell to provide a space therebetween, and conduit means for alternately connecting said space to a source of vacuum and to atmospheric pressure, said inflation including a body portion and having a mouth at the upper end of the body portion and having a nipple at the lower end of the body portion and adapted to be connected to a continuous source of vacuum, said upper body section having a substantially uniform wall thickness throughout its length and having a substantially greater wall thickness than the wall thickness of said lower body section, said lower body section having a substantially uniform wall thickness throughout its length, the junction between the upper body section and the lower body section being disposed approximately at the termination of the teat end when the inflation is applied to the cow's teat, and said lower section initially collapsing when atmospheric pressure is applied to the outer surface of said inflation to thereby shut off the vacuum to the sphincter muscle of the teat.

References Cited by the Examiner

UNITED STATES PATENTS

| | | | |
|---|---|---|---|
| 1,945,386 | 1/1934 | Stampen | 119—14.52 |
| 2,541,988 | 2/1951 | Cyphers | 119—14.52 |
| 2,621,626 | 12/1952 | Harris | 119—14.52 |
| 2,670,709 | 3/1954 | Stampen | 119—14.52 |
| 3,096,740 | 7/1963 | Noorlander | 119—14.52 |
| 3,158,136 | 11/1964 | George | 119—14.52 |

ALDRICH F. MEDBERY, *Acting Primary Examiner.*

UNITED STATES PATENT OFFICE
CERTIFICATE OF CORRECTION

Patent No. 3,289,634 December 6, 1966

Clifford G. Simons

It is hereby certified that error appears in the above numbered patent requiring correction and that the said Letters Patent should read as corrected below.

Column 1, line 45, before "vacuum" insert -- collapse and close off the inflation to thereby relieve the --.

Signed and sealed this 24th day of October 1967.

(SEAL)
Attest:

Edward M. Fletcher, Jr.
Attesting Officer

EDWARD J. BRENNER
Commissioner of Patents